(12) United States Patent
Cho et al.

(10) Patent No.: US 7,747,121 B2
(45) Date of Patent: Jun. 29, 2010

(54) BENDING WAVEGUIDE, METHOD OF FABRICATING THE BENDING WAVEGUIDE, LIGHT DELIVERY MODULE EMPLOYING THE BENDING WAVEGUIDE, AND HEAT ASSISTED MAGNETIC RECORDING HEAD EMPLOYING THE BENDING WAVEGUIDE

(75) Inventors: Eun-hyoung Cho, Yongin-si (KR); Sung-dong Suh, Yongin-si (KR); Jin-seung Sohn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 11/758,295

(22) Filed: Jun. 5, 2007

(65) Prior Publication Data
US 2008/0107377 A1 May 8, 2008

(30) Foreign Application Priority Data
Nov. 2, 2006 (KR) .................... 10-2006-0107930

(51) Int. Cl.
*G02B 6/10* (2006.01)
(52) U.S. Cl. .................. 385/129; 385/130; 385/131; 385/132
(58) Field of Classification Search .................. None
See application file for complete search history.

(56) References Cited

U.S. PATENT DOCUMENTS

| 6,434,282 | B1 * | 8/2002 | Binkley et al. ................. 385/8 |
| 6,834,537 | B1 * | 12/2004 | Niwa et al. .................... 73/105 |
| 2003/0016926 | A1 * | 1/2003 | Hofstadler et al. .......... 385/125 |
| 2004/0004767 | A1 * | 1/2004 | Song ........................... 359/566 |
| 2005/0058399 | A1 * | 3/2005 | Nishizawa et al. ............. 385/39 |
| 2007/0230010 | A1 * | 10/2007 | Jin et al. ........................ 360/69 |
| 2007/0230870 | A1 * | 10/2007 | Smith et al. .................... 385/32 |

* cited by examiner

*Primary Examiner*—Uyen Chau N Le
*Assistant Examiner*—Chad H Smith
(74) *Attorney, Agent, or Firm*—Sughrue Mion, PLLC

(57) ABSTRACT

A bending waveguide is provided including a core having an input end and an output end, wherein the output end has a near field enhanced aperture structure, and a metal cladding enclosing the core. The core is bent in a curve and a radius of curvature of the curve is a resonance radius at which an intensity of transmitted light with respect to a wavelength of incident light is a maximum. Thus, the direction of the incident light can be changed by a predetermined angle while maintaining the field enhancement characteristic of the conventional near field enhanced aperture without an additional optical element.

22 Claims, 21 Drawing Sheets
(4 of 21 Drawing Sheet(s) Filed in Color)

1st PROPAGATION MODE

2nd PROPAGATION MODE

3rd PROPAGATION MODE

40nm AFTER PASSING APERTURE

40nm AFTER PASSING APERTURE

BENDING WAVEGUIDE, METHOD OF FABRICATING THE BENDING WAVEGUIDE, LIGHT DELIVERY MODULE EMPLOYING THE BENDING WAVEGUIDE, AND HEAT ASSISTED MAGNETIC RECORDING HEAD EMPLOYING THE BENDING WAVEGUIDE

CROSS-REFERENCE TO RELATED PATENT APPLICATIONS

This application claims priority from Korean Patent Application No. 10-2006-0107930, filed on Nov. 2, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a bending waveguide, a method of fabricating the bending waveguide, a light delivery module employing the bending waveguide, and a heat assisted magnetic recording head employing the bending waveguide, and more particularly, to a bending waveguide which can embody an enhanced near field light and be fabricated as an integrated type, a method of fabricating the bending waveguide, a light delivery module employing the bending waveguide, and a heat assisted magnetic recording head employing the bending waveguide.

2. Description of the Related Art

In the field of magnetic recording heads, a heat assisted magnetic recording (HAMR) method has been studied to achieve high density magnetic recording. In the HAMR method, recording is performed by heating a local portion of a recording medium to around the Curie temperature to temporarily reduce a coercive force at a corresponding position. By using the HAMR method, the magnitude of a magnetic field needed for recording can be reduced compared to a conventional magnetic recording method. Since an area where data is recorded is a portion heated to around the Curie temperature, a recording density is determined, not by the size of a pole generating a magnetic field between gaps, but by the width of the heated portion. For example, when a heating means is a laser diode, the data recording density is determined by the size of a spot of a laser beam emitted by the laser diode.

Accordingly, the HAMR head requires a light delivery module to emit a laser beam onto a recording medium. The light delivery module delivers light to a position close to a main pole and provides a high light intensity while decreasing the size of a light spot formed on the recording medium. The light delivery module includes a light source, a waveguide, and an aperture and is integrated in a small space close to the main pole. However, in order not to greatly change the structure of the related art magnetic head, the position where the light delivery module is arranged is limited. For example, it is easy to arrange the waveguide that delivers light from the light source to the aperture perpendicular to the main pole. In this case, the direction of the waveguide is inclined by 90° from a direction of the aperture arranged close to the end portion of the main pole. Thus, an optical element capable of changing the direction by 90° between the waveguide and the aperture is needed. A mirror can be used as the optical element, but it is practically difficult to integrate an optical element that is bulky above the conventional magnetic head manufactured into a thin film.

Further, the light delivery module is preferably manufactured through a batch process as in a conventional magnetic head manufacturing process. For example, a light delivery module that can be manufactured in a low temperature process below 175° C. and a waveguide and an aperture can be manufactured by a planar process.

The aperture delivers the transmitted light through the waveguide to a recording layer of the recording medium. To achieve a high recording density, while having an appropriate near field spot size, the light delivered to the recording layer must have a high intensity sufficient to heat the recording layer to around the Curie temperature. In general, the minimum spot size is determined by the size of the aperture. As the size of the aperture decreases, a greater improvement in the recording density can be expected. However, when the size of the aperture is smaller than a wavelength of incident light, power throughput of the aperture is greatly reduced. That is, when the aperture is made small, a high spatial resolution is realized but the application of the aperture is limited because the power throughput is too small. To overcome a low transmission efficiency problem, a variety of near field light enhanced apertures have been studied and introduced. However, it is difficult to manufacture a near field light enhanced aperture which can be easily installed in an apparatus having a limited installation space such as the HAMR head.

SUMMARY OF THE INVENTION

Exemplary embodiments of the present invention provide a bending waveguide which can emit a near field light by changing a light direction such that the light delivery module of the HAMR head can be easily installed, a method of fabricating the bending waveguide, a light delivery module employing the bending waveguide, and a heat assisted magnetic recording head employing the bending waveguide.

According to a first aspect of the present invention, a bending waveguide comprises a core having an output end of a near field enhanced aperture structure emitting a near field light enhanced by changing an energy distribution of incident light, and a metal cladding enclosing the core, wherein the core is bent in a curve and a radius of curvature of the curve is a resonance radius at which an intensity of transmitted light with respect to a wavelength of the incident light is maximized.

According to a second aspect of the present invention, a method of fabricating a bending waveguide comprises forming a lower cladding layer by depositing metal on a substrate, depositing a core layer patterned as a curve having a predetermined radius of curvature on the lower cladding layer, wherein the width and thickness of the core layer are equal to or less than a wavelength of incident light and the radius of curvature is formed such that an intensity of transmitted light with respect to a wavelength of the incident light is maximized, and forming an upper cladding layer by depositing metal on the core layer.

According to a third aspect of the present invention, a light delivery module comprises a first waveguide which comprises a core having an output end of a near field enhanced aperture structure emitting a near field light enhanced by changing an energy distribution of incident light and a metal cladding enclosing the core, wherein the first waveguide is a bending waveguide in which the core is bent in a curve and a radius of curvature of the curve is a resonance radius at which an intensity of transmitted light with respect to a wavelength of the incident light is maximum.

According to a fourth aspect of the present invention, a heat assisted magnetic recording head includes a magnetic recording portion forming a magnetic field to record information on a magnetic recording medium and a light delivery module emitting light to heat a recording scheduled area of the magnetic recording medium, wherein the light delivery module comprises a first waveguide which comprises a core having an output end of a near field enhanced aperture structure emitting a near field light enhanced by changing an energy distribution of incident light and a metal cladding enclosing the core, and a second waveguide transmitting light to the first waveguide, wherein the first waveguide is a bending waveguide in which the core is bent in a curve and a radius of curvature of the curve is a resonance radius at which an intensity of transmitted light with respect to a wavelength of the incident light is maximum.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other exemplary aspects and advantages of the present invention will become more apparent from the following detailed description of exemplary embodiments thereof with reference to the attached drawings in which.

DETAILED DESCRIPTION OF EXEMPLARY EMBODIMENTS OF THE INVENTION

Figure 1A:
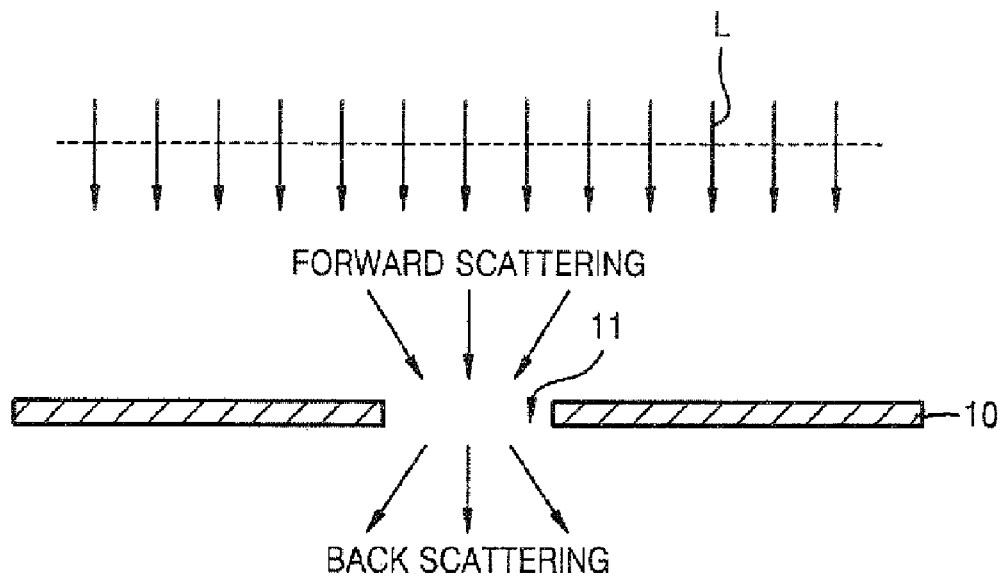
FIGS. 1A and 1B show a field enhancement mechanism.
Figure 1B:
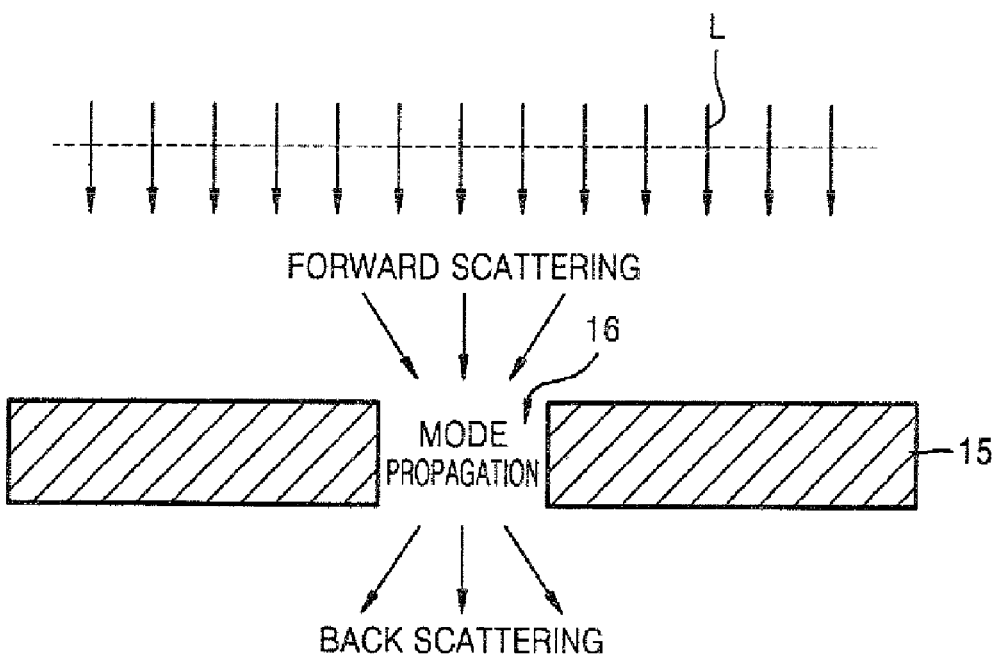
Figure 2:
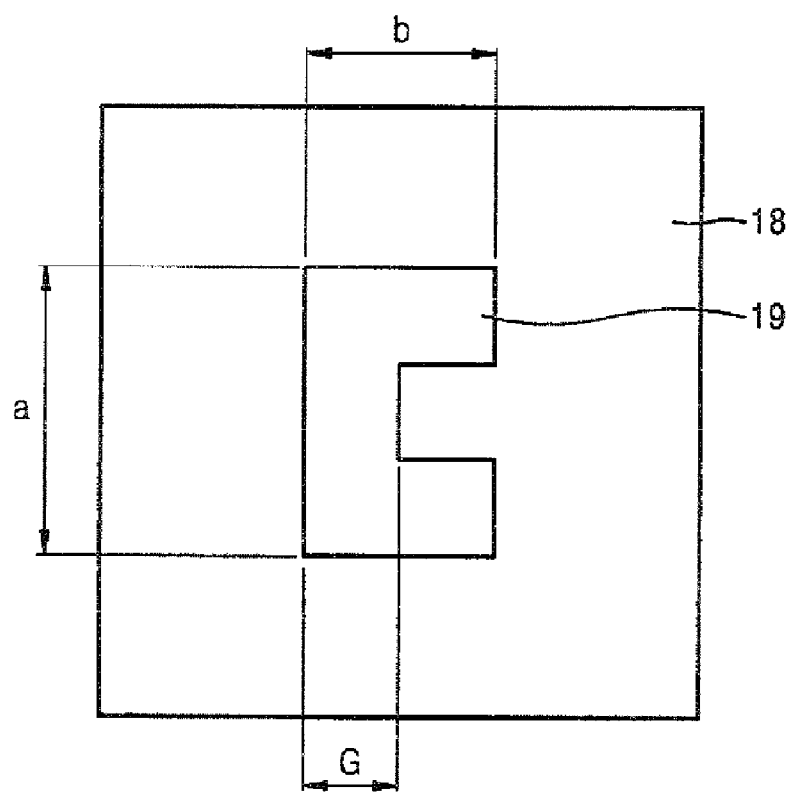
FIG. 2 is a front side view of a C-shaped aperture.

FIGS. 1A and 1B show a field enhancement mechanism. Referring to FIG. 1A, a near field enhanced aperture 11 through which light passes is provided in a thin metal plate 10. The near field enhanced aperture 11 is an aperture from which enhanced near field light is emitted, for example, a C-shaped aperture as shown in FIG. 2. For the thin metal plate 10, a transmission resonance condition must be met for light L to pass through the near field enhanced aperture 11. The transmission resonance is caused by surface resonant oscillation of electric charges and current of the thin metal plate 10 generated from an input end and an output end of the near field enhanced aperture 11. The incident light satisfying the transmission resonance condition is field enhanced at the near field enhanced aperture 11 so as to be back scattered without a sharp reduction of transmissivity.

Referring to FIG. 1B, for a thick metal plate 15, additional oscillation of electric charges and current is generated in a near field enhanced aperture 16 and a different type of thickness resonance exists. Thus, the overall transmission and field enhancement in the near field enhanced aperture 16 is determined by the interaction of the surface resonant oscillation and the thickness resonance. The thickness resonance is generated when the light L passing in a direction along the thickness of the near field enhanced aperture 16 forms a standing wave, as described later. That is, when the metal plate 15 has a certain thickness or more, in order for the light L incident on the near field enhanced aperture 16 to smoothly pass through the near field enhanced aperture 16, the metal plate 15 and the incident light L must satisfy a predetermined thickness resonance condition.

Next, referring to FIGS. 2 through 7C, a resonance characteristic of the metal plate according to the thickness thereof is described.

Figure 3:
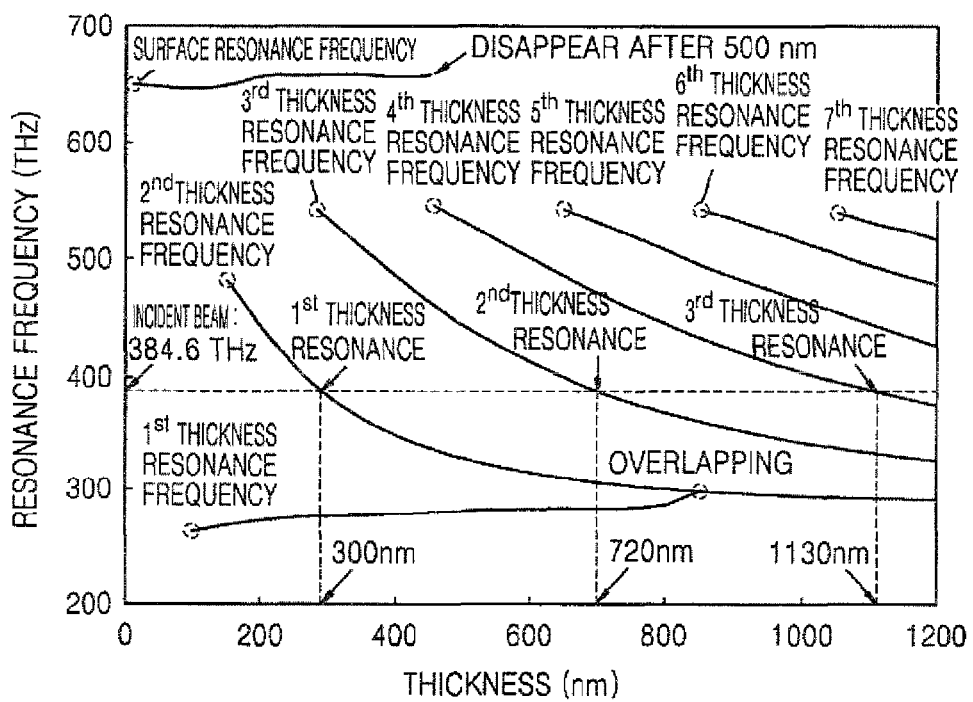
FIG. 3 is a graph showing the resonance frequency versus the thickness of the C-shaped aperture of FIG. 2.

FIG. 2 shows a C-shaped aperture 19 provided in a metal plate 18 as an example of a near field enhanced aperture structure. FIG. 3 is a graph showing the resonance characteristic of the metal plate 18 versus the thickness thereof. The metal plate 18 is formed of gold (Au) exhibiting a superior conductivity, and a thickness thereof varies several nm to 1200 nm. Also, the C-shaped aperture 19 has a vertical length "a" of 270 nm, a horizontal length "b" of 180 nm, and a gap "G" of 90 nm.

Figure 4:
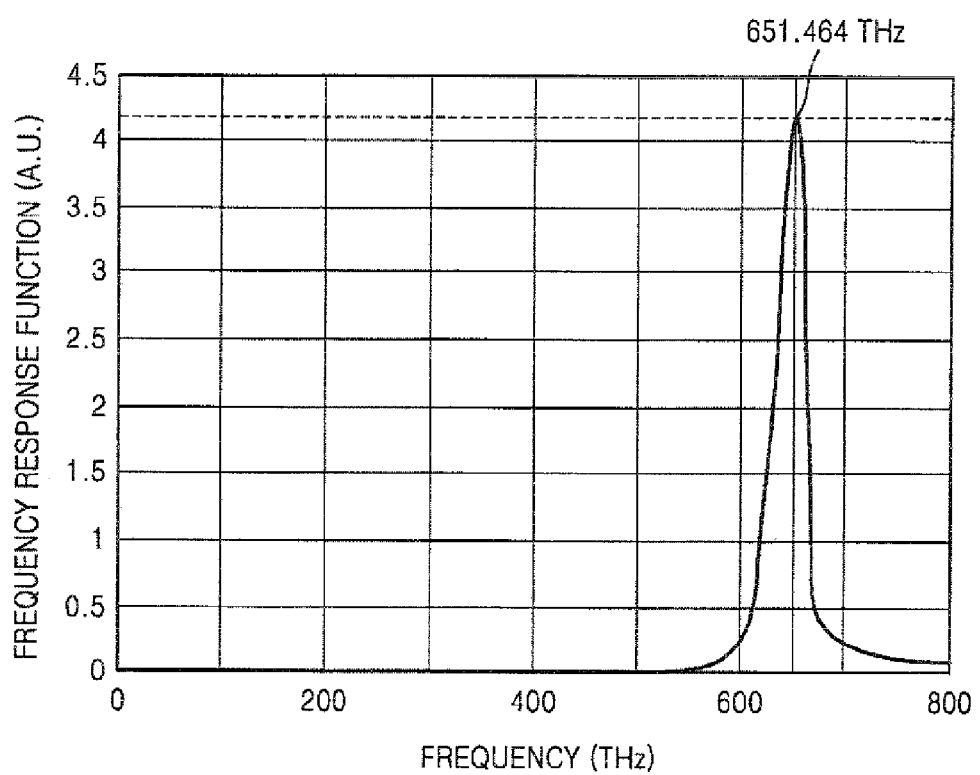
FIG. 4 is a graph showing a frequency response function versus the frequency when the thickness of the C-shaped aperture of FIG. 2 is 10 nm.

When the metal plate 18 is a thin film having a thickness of several nanometers to tens of nanometers, the resonance characteristic of the C-shaped aperture 19 shows that a surface resonant oscillation frequency appears around 650 THz (651.464 THz in FIG. 4). When the thickness of the metal plate 18 is within a range of several nanometers to 500 nm, the surface resonant oscillation frequency is maintained regardless of a change in the thickness and disappears when the thickness of the metal plate 18 is over 500 nm.

FIG. 4 is a graph of a frequency response function (FRF) showing the aperture resonance characteristic of the thin metal plate 18. The FRF is obtained by inputting an impulse to the C-shaped aperture 19 provided in the thin metal plate 18 and obtaining an response. The aperture resonance at a peak point is caused by the surface resonant oscillation of electric charges and current of the metal plate 18 generated at an input end and an output end of the C-shaped aperture 19. That is, as the electric charges and current are coupled and surface resonant oscillation is generated at the input and output ends of the C-shaped aperture 19, the incident light can transmit through the C-shaped aperture 19 in form of an evanescent wave.

When the thickness of the metal plate 18 exceeds 500 nm, the surface resonant oscillation of the electric charges and current are not coupled at the input and output ends of the C-shaped aperture 19, hence transmission by the surface resonant oscillation cannot be expected. However, as shown in the graph of FIG. 3, as the thickness of the metal plate 18 increases, other resonance frequencies continuously appear in addition to the first resonance frequency, i.e., the surface resonant oscillation frequency. For example, a thickness resonance is generated around a position where the thickness of the metal plate 18 is slightly less than 100 nm, and the first thickness resonance frequency corresponding thereto gradually increases according to an increase in the thickness. Another thickness resonance is generated around a position where the thickness of the metal plate 18 is 100 nm, and the second thickness resonance frequency corresponding thereto is gradually decreased as the thickness increases. The first and second thickness resonance frequencies overlap around a position where the thickness of the metal plate 18 is 850 nm.

Figure 5:
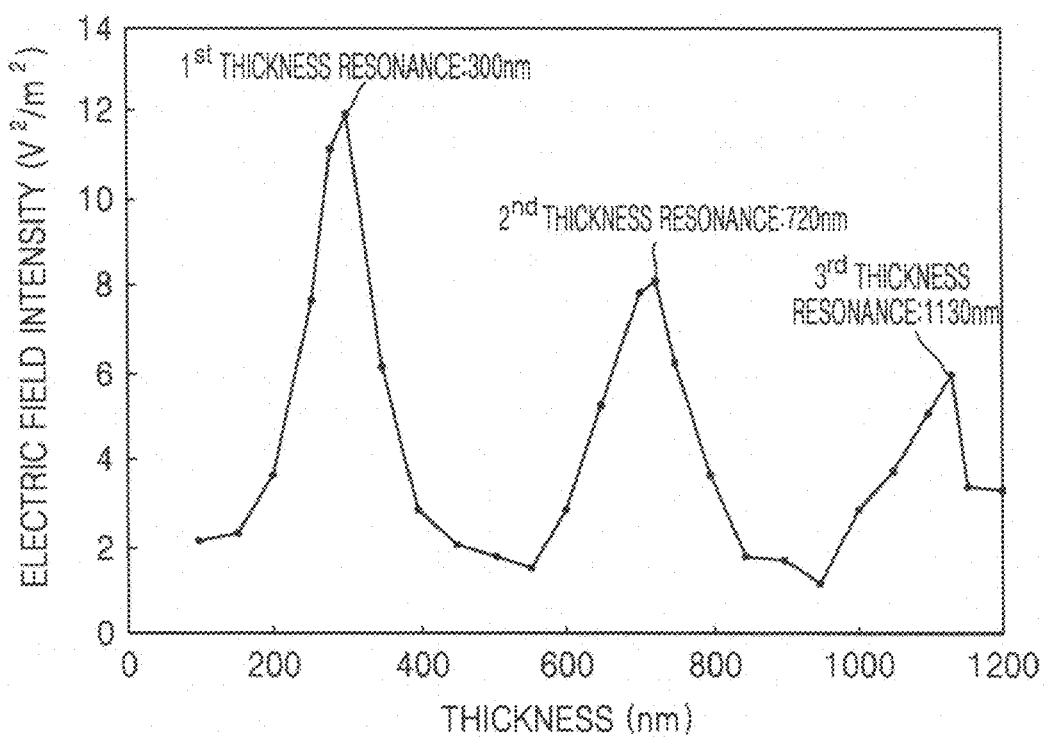
FIG. 5 is a graph showing the electric field intensity versus the thickness of the C-shaped aperture of FIG. 2.

When the frequency of the incident light is 384.6 THz, the thickness resonance can be expected at positions where the thickness is 300 nm, 720 nm, and 1130 nm as shown in FIG. 3. FIG. 5 is a graph showing the thickness resonance as the intensity of a transmitted electric field, that is, the intensity of light, versus the thickness of the metal plate 18. Referring to FIG. 5, the intensity of light is the strongest at the first thickness resonance and gradually decreases at the second and third thickness resonances. However, although the thickness of the metal plate 18 increases, the field enhancement characteristic of the C-shaped aperture 19 still remains constant.

Figure 6A:
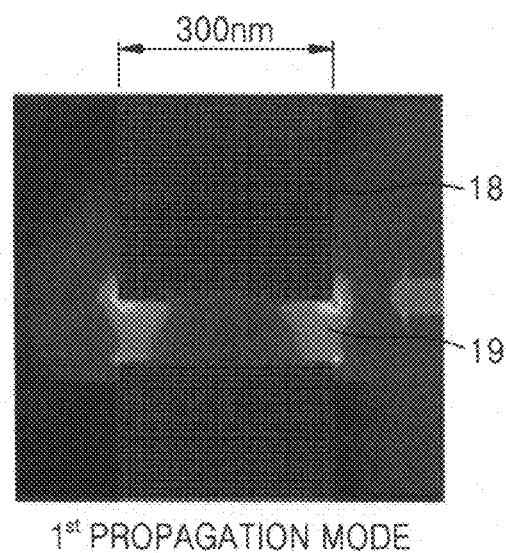
FIGS. 6A through 6C are images that visualize a radio wave mode according to the thickness of the C-shaped aperture.
Figure 6B:
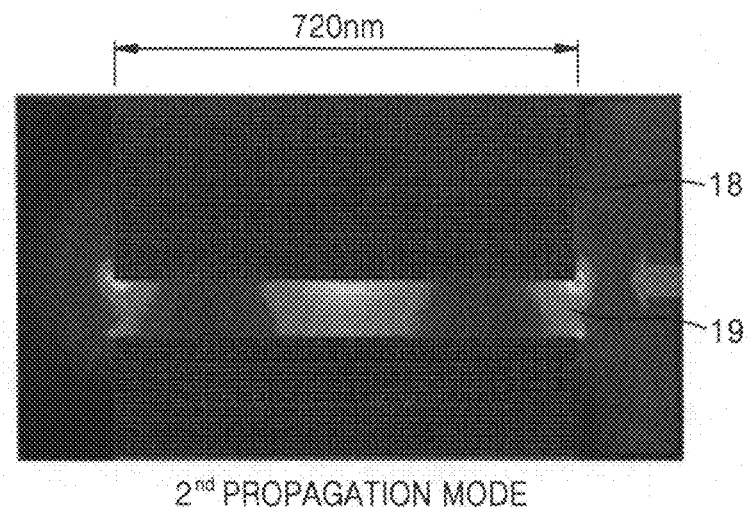
Figure 6C:
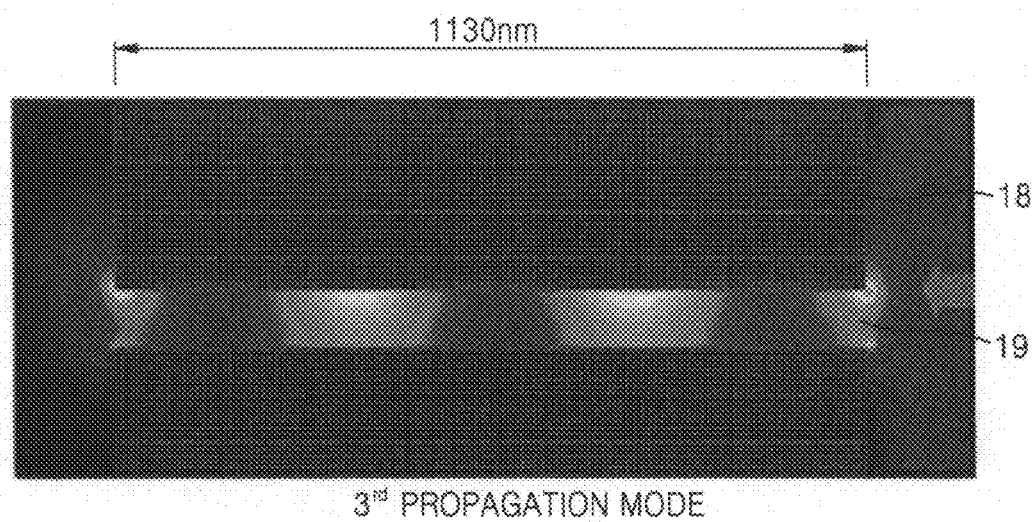

FIGS. 6A through 6C show the distribution of the intensity of light propagated in the C-shaped aperture 19. As shown in FIGS. 6A through 6C, as the thickness of the metal plate 18 increases, the distribution of the intensity of light propagated in the C-shaped aperture 19 shows a pattern of first, second, and third standing waves. That is, when the light propagated in the C-shaped aperture 19 forms a standing wave, the light can be transmitted without a sharp reduction in transmission throughput, and the thickness of the metal plate 18 corresponds to a node interval of the standing wave.

Figure 7A:
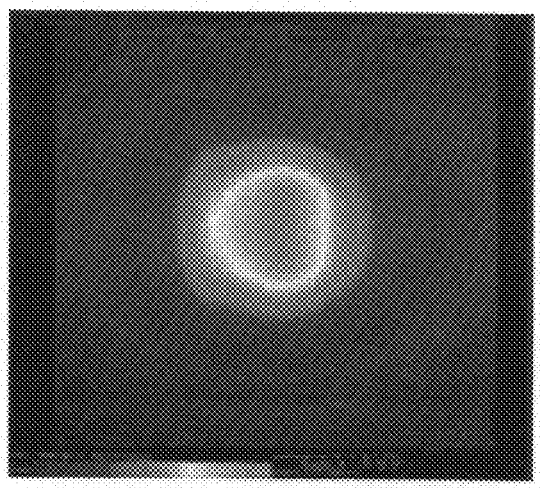
FIGS. 7A through 7C are images that visualize the intensity of an electric field at a distance of 40 nm after passing through the C-shaped aperture of FIGS. 6A through 6C.
Figure 7B:
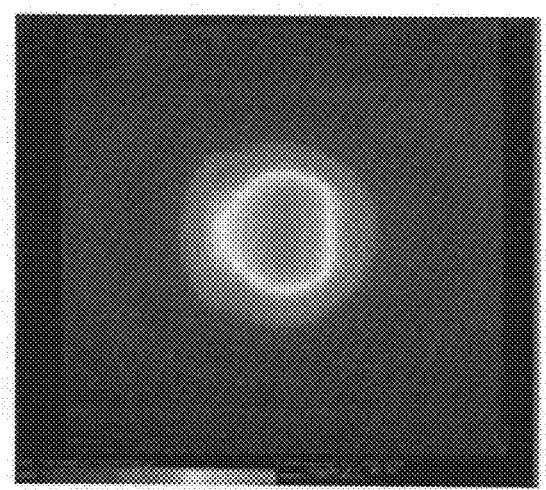
Figure 7C:
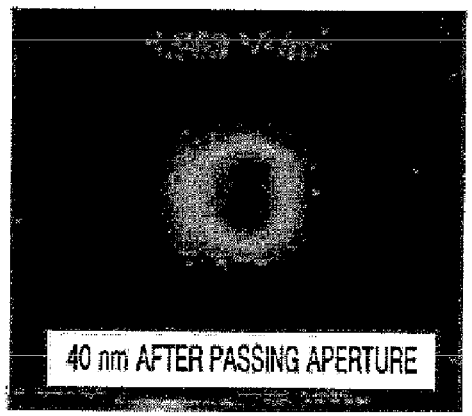

FIGS. 7A through 7C show spot shapes of the light at a distance of 40 nm after passing through the C-shaped aperture 19 of FIGS. 6A through 6C. The spots are similar to one another in size and shape but differ in intensity of light. The size and shape of the spots are similar because the shape of a section of an aperture at the output end of the C-shaped aperture 19 is a C shape in all cases.

Figure 8A:
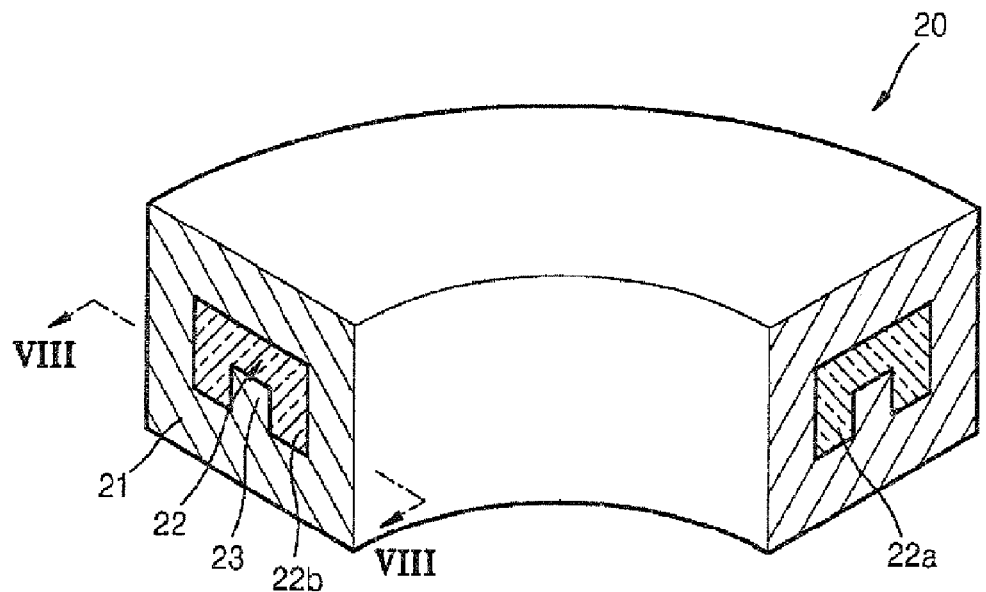
FIGS. 8A and 8B are a perspective view and a cross-sectional view, respectively of a bending waveguide according to an exemplary embodiment of the present invention.
Figure 8B:
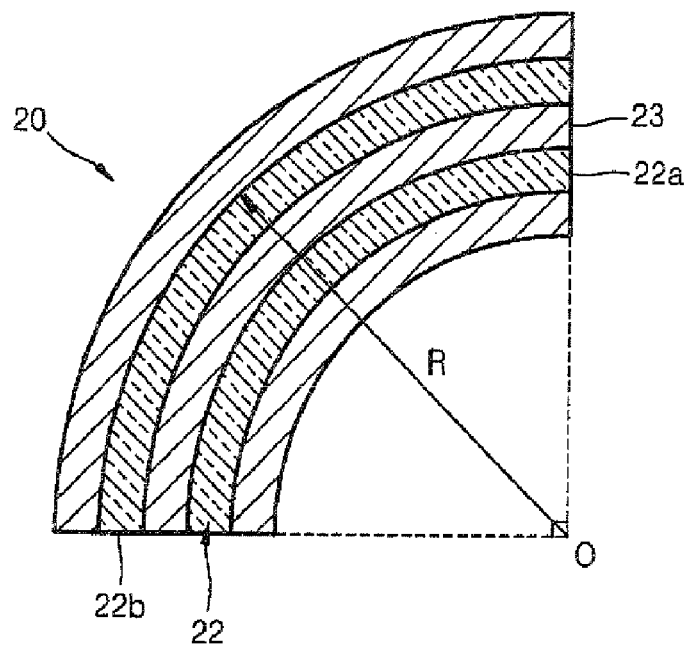

Exemplary embodiments of the present invention using the above-described principle will be described below. FIG. 8A is a perspective view of a bending waveguide according to an embodiment of the present invention. FIG. 8B is a cross-sectional view taken along line VIII-VIII of FIG. 8A.

Figure 13A:
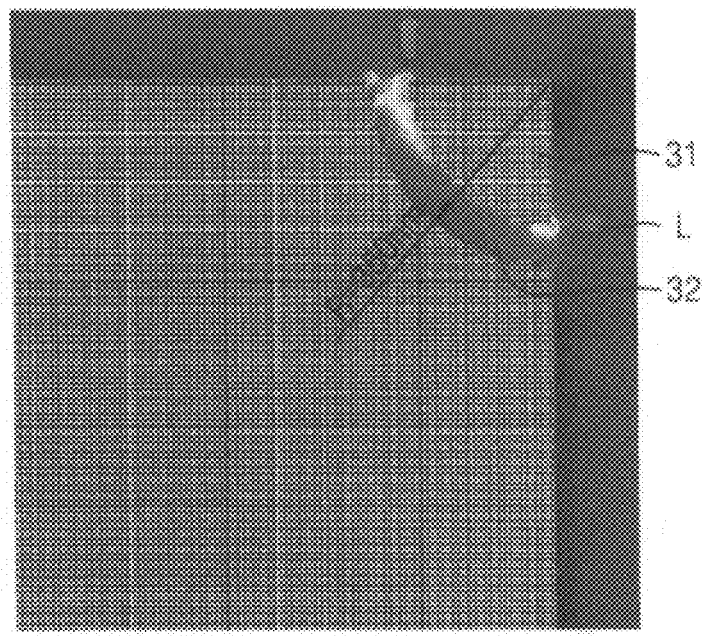
FIGS. 13A and 13B are images showing the intensity of an electric field in the bending waveguide.
Figure 13B:
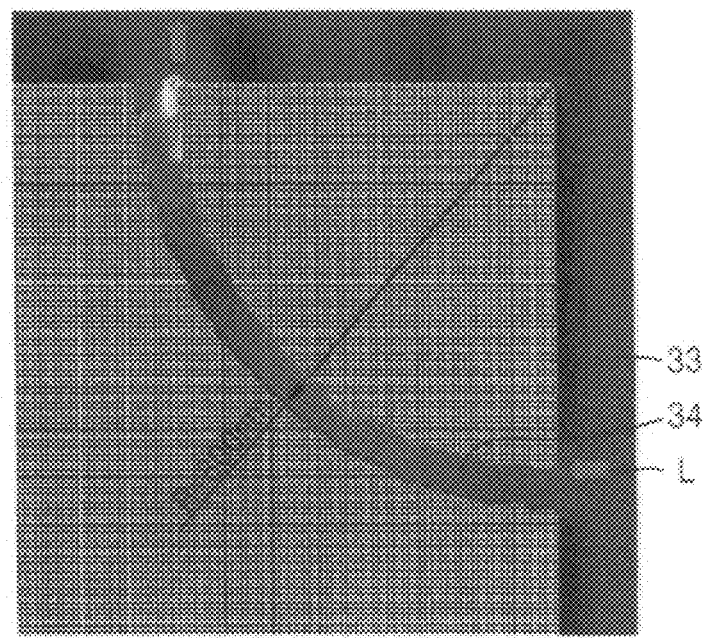

Referring to FIGS. 8A and 8B, a bending waveguide 20 according to the present embodiment includes a core 22 that is bent as a curve and a metal cladding 21 enclosing the core 22. The metal cladding 21 is formed of a conductive metal material. The outer shape of the metal cladding 21 is similar to the curved shape of the core 22, but the present invention is not limited thereto. For example, as shown in FIGS. 13A and 13B, the outer shape of a metal cladding 31 may be a rectangle when viewed from the surface where the core 22 that is bent is placed.

The core 22 is formed of a transparent material capable of transmitting light. The core 22 has a curve having a predetermined radius of curvature R and bent by 90°. A vertical section of the core 22 has a C-shaped aperture structure having a ridge portion 23 formed by part of the metal cladding 21 protruding towards the center of the core 22 throughout the overall area of the core 22. Accordingly, an input end 22a and an output end 22b of the core 22 has a C-shaped aperture structure. The size of the C-shaped aperture is designed to be the same as or less than the wavelength and amount of the incident light. Thus, near field light having a small spot size can be emitted.

The C-shaped aperture is an example of the near field light enhanced structure and emits near field light enhanced by changing the energy distribution of incident light. The near field light enhanced aperture may include, for example, a C-shaped aperture, an L-shaped aperture, an X-shaped aperture, a bow-tie antenna probe, etc.

It is advantageous for the radius of curvature R of the core to be a resonance radius at which the intensity of transmitted light with respect to the wavelength of the incident light is maximum as is described later. The resonance radius in the bending waveguide 20 in the present embodiment will be described below.

When the thickness of the metal plate increases, the distance between the input end and output end of the aperture increases. Thus, the aperture can be interpreted as a sort of a waveguide core. That is, the C-shaped aperture 19 described with reference to FIGS. 2 through 7C can be regarded as a sort of a straight C-shaped waveguide. The bending waveguide 20 according to the present embodiment can be regarded as a circular bend C-shaped waveguide.

According to the description with reference to FIGS. 2 through 7C, for incident light to pass through the C-shaped aperture 19 provided in the thick metal plate 18, a thickness resonance condition needs to be met. Similarly, the core 22 in the present embodiment needs to satisfy a predetermined resonance condition to transmit incident light without a great loss.

Figure 9:
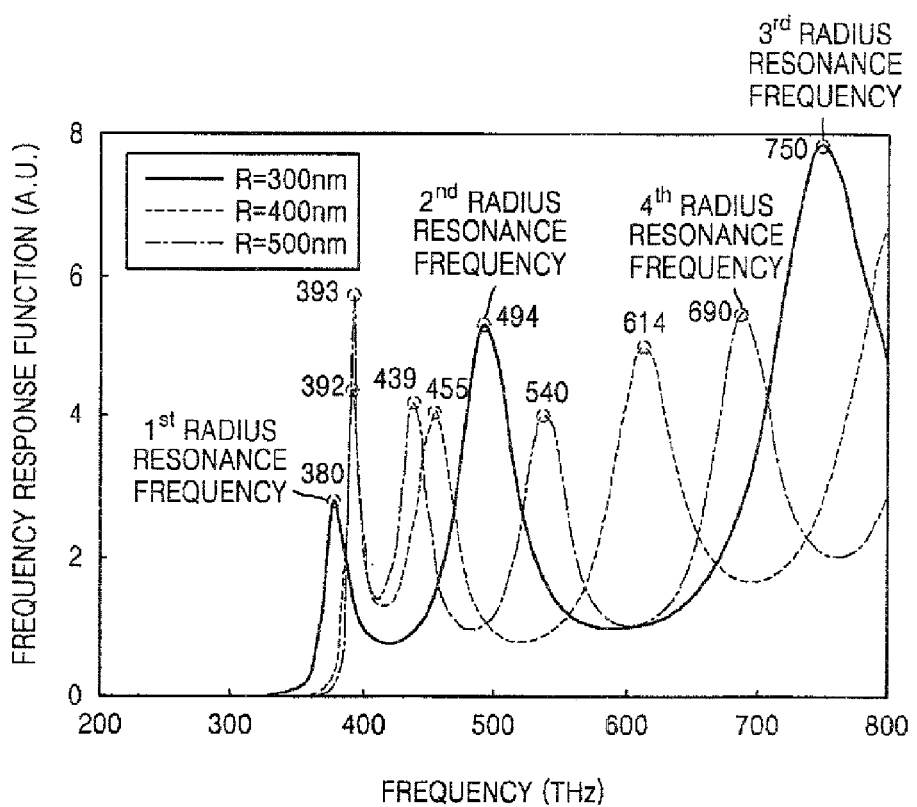
FIGS. 9 and 10 are graphs showing the radius resonance frequency according to the frequency of the bending waveguide of FIG. 8A.
Figure 10:
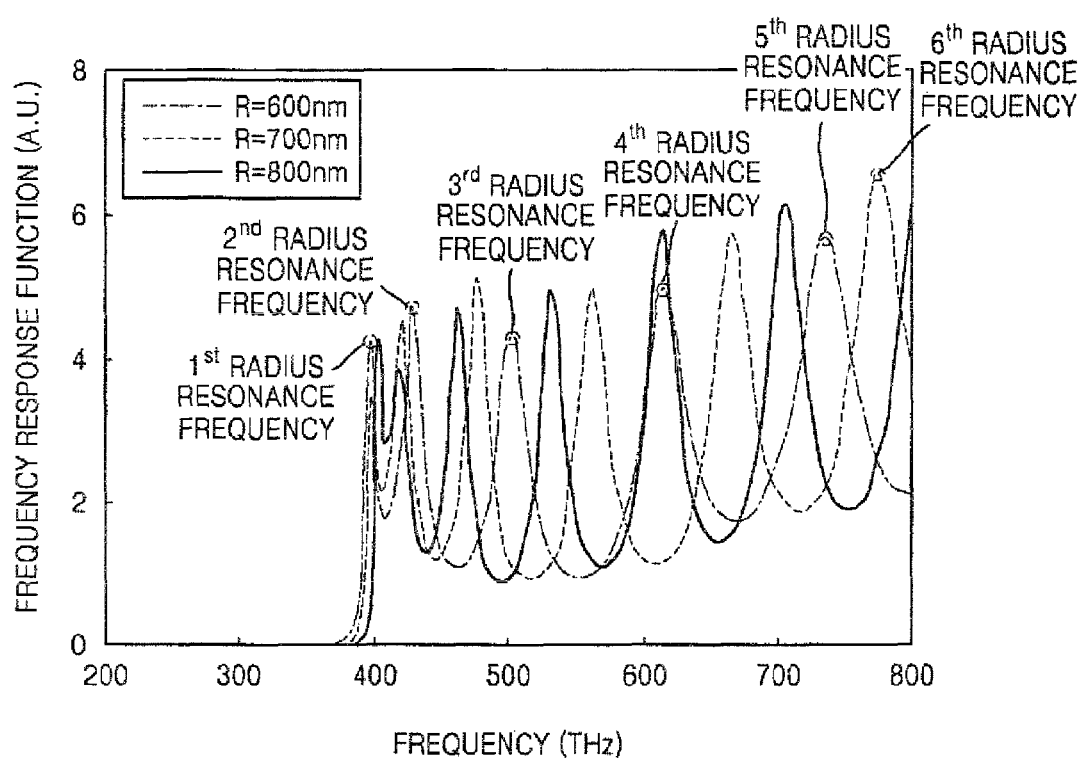

FIGS. 9 and 10 are graphs showing the Frequency Response Function (FRF) with respect to an input frequency of the bending waveguide 20 according to the present embodiment and the radius resonance characteristic of the bending waveguide 20. Referring to FIGS. 9 and 10, when the radius of curvature R of the bending waveguide 20 varies to 300 nm, 400 nm, 500 nm, 600 nm, 700 nm, and 800 nm, it can be seen that different radius resonance frequencies are generated. When the radius of curvature R is 300 nm, three peaks of 380 THz, 494 THz, and 750 THz exist between 200 THz-800 THz. The first frequency peak, that is, the first radius resonance frequency, gradually moves to the a higher frequency as the radius of curvature R increases and it can be seen that the magnitude of the first frequency peak extends. The other frequency peaks, that is, the second and higher radius resonance frequencies, quickly move towards the first frequency peak as the radius of curvature R increases. Accordingly, the magnitude of each of the other frequency peaks is gradually decreased. Also, as the radius of curvature R increases, new peaks are continuously generated around 800 THz and their behavior is similar to those of the other peaks.

Figure 11:
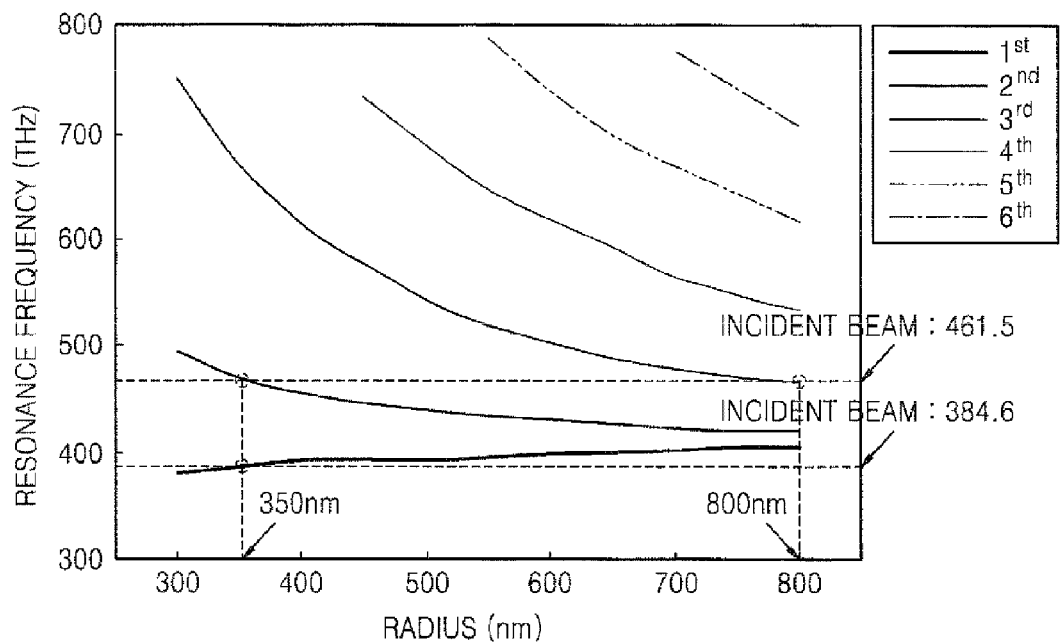
FIG. 11 is a graph showing the radius resonance frequency according to the radius of the bending waveguide of FIG. 8A.

FIG. 11 is a graph showing the change in the radius resonance frequencies according to a change in the radius of curvature based on the results of FIGS. 9 and 10. In the change pattern of the resonance frequency, as described above, only the first radius resonance frequency gradually increases according to the increase of the radius of curvature, and the other frequencies decrease according to an exponential function according to the increase of the radius of curvature. This pattern is almost similar to the pattern of the C-shaped aperture, that is, the straight C-shaped waveguide, described with reference to FIG. 3. However, in contrast to the straight C-shaped waveguide, the surface resonant oscillation frequency which is almost constant with the increase of the thickness does not appear in FIGS. 9 and 10. This can be understood as follows. For the straight C-shaped waveguide, the input end and the output end are located in the same direction. Thus, there is a coupling between the electric charges existing between two surfaces so that an evanescent wave bridging the input end and the output end exists. In this case, when further coupling is made difficult as the thickness increases over a predetermined limit, the evanescent wave ceases to exist and further surface resonant oscillation frequencies are not generated.

In contrast, for the circular bend C-shaped waveguide such as the bending waveguide 20 according to the present embodiment, since the input end and the output end make an angle of 90°, the coupling between the electric charges existing between the input end and the output end is impossible and also the surface resonant oscillation frequency does not exist.

When the frequency of the incident light is 461.5 THz, a resonance occurs in the bending waveguide 20 if the radius of curvature R is 350 nm and 800 nm. Thus, when the frequency of the incident light is 461.5 THz; by designing the radius of curvature R of the bending waveguide 20 having a core of a C-shaped aperture structure to be 350 nm or 800 nm, the intensity of an electric field is not greatly reduced and the field enhancement characteristic can be maintained.

Figure 12:
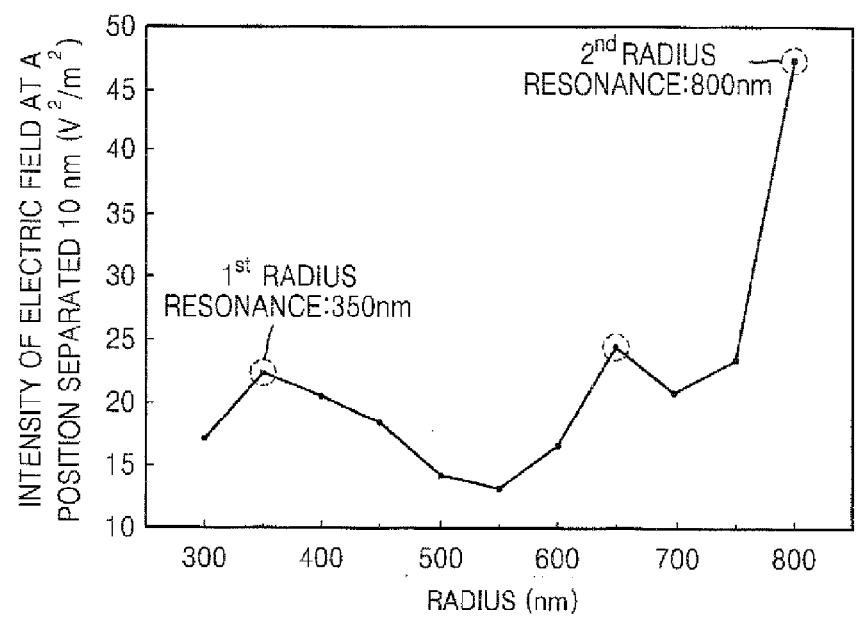
FIG. 12 is a graph showing the intensity of an electric field at a distance of 10 nm after passing through the aperture versus the radius of the bending waveguide of FIG. 8A.

FIG. 12 is a graph showing change in intensity of the electric field according to a change in the radius of curvature. In the graph, when the frequency of incident light is 461.5 THz, the intensity of the electric field is a maximum at a position separated 10 nm from the output end of the bending waveguide 20, when the radius of curvature R is 350 nm and 800 nm. This matches the interpretation of FIG. 11 and it can be confirmed that the resonance radius is 350 nm and 800 nm when the frequency of incident light is 461.5 THz.

FIGS. 13A and 13B show the distribution of the intensity of light propagating in a bending waveguide having a pre-determined resonance radius. The bending waveguide shown in FIGS. 13A and 13B is substantially the same as the bending waveguide 20 shown in FIGS. 8A and 8B, except for the shape of the metal cladding 31. Referring to FIGS. 13A and 13B, the resonance order of the bending waveguide increases according to the increase of the radius of curvature R of the core 32. Accordingly, the pattern of the light intensity changes inside the bending waveguide.

Referring to FIGS. 9 through 13B, when the waveguide is bent, a resonance characteristic corresponding to the thickness resonance in a straight waveguide occurs. Resonance is generated when the wavelength of the incident light and the radius of curvature of the bending waveguide satisfy a predetermined relationship as shown in FIG. 11. That is, the resonance radius in the present embodiment is a radius of curvature at which the intensity of transmitted light is a maximum with respect to the wavelength of the incident light, that is, the resonance is generated with respect to the wavelength of the incident light.

As described above, according to the bending waveguide 20 of FIG. 8A, in the present embodiment, even when the direction of the input end 22a and the direction of the output end 22b are different by 90°, if the radius resonance condition is satisfied, the direction of the transmitted light can be changed by 90°. Also, since the bending waveguide 20 in the present embodiment has not only the direction change but also the output end having a C-shaped aperture structure, a near field light having a small spot size not more than the wavelength of the incident light and a strong light intensity can be emitted. The bending waveguide 20 in the present embodiment changes the direction of the light by 90°, but the present invention is not limited thereto.

Figure 14A:
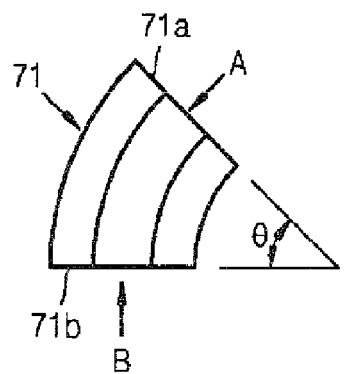
FIGS. 14A and 14B show modified examples of the bending waveguide of FIGS. 8A and 8B.
Figure 14B:
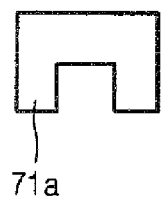

FIGS. 14A and 14B show a modified example of the above-described embodiment in which the direction of the transmitting light is changed by an arbitrary angle θ(0<<180). Since the outer shape of the metal cladding does not need to be specially defined, only a core 71 of a bending waveguide is shown in FIGS. 14A and 14B. FIG. 14B shows the structure of the core 71 having a C-shaped aperture viewed in directions A and B. In the bending waveguide 20 in the present modified example, the angle between the input end 71a and the output end 71b is θ and the distance between the input end 71a and the output end 71b is proportional to the angle θ. Since the distance between the input end 71a and the output end 71b is a variable in the radius resonance condition, the resonance radius of the core 71 according to the present modified example may vary according not only to the wavelength of the incident light but also to the angle θ.

Figure 15:
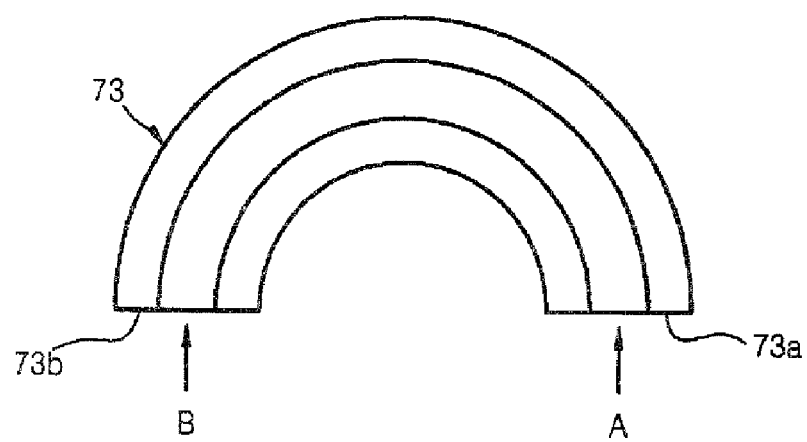
FIG. 15 is another modified example of the bending waveguide of FIGS. 8A and 8B.

FIG. 15 shows another modified example of the above embodiment described with reference to FIGS. 8A and 8B. In the present modified example, the shape of a cross section of a core 73 at an arbitrary position or the shapes of an input end 73a and an output end 73b are substantially the same as that of FIG. 14B. In the present modified example, in which the angle θ of FIG. 14A is 180°, the direction of the transmitted light is changed by 180°. The angle θ of FIG. 14A can be an arbitrary value.

Figure 16:
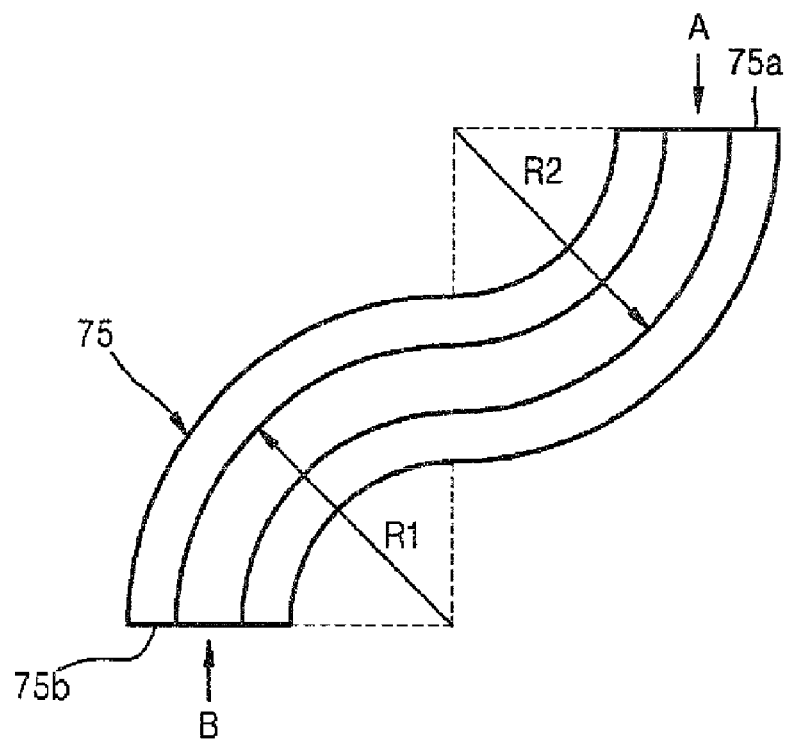
FIG. 16 is a cross-sectional view of a bending waveguide according to another exemplary embodiment of the present invention.

FIG. 16 shows a bending waveguide according to another exemplary embodiment of the present invention. Referring to FIG. 16, the bending waveguide in the present embodiment includes a core 75 that is bent in a letter "S". Since the outer shape of the metal cladding in the present embodiment does not need any special definition, FIG. 16 shows only the core 75 of the bending waveguide. Also, in the present modified example, the shape of a cross section of the core 75 at an arbitrary position or the shapes of an input end 75a and an output end 75b may be the C-shaped aperture that is substantially the same as that of FIG. 14B.

The core 75 can be understood as a shape of connecting two cores 22 described with reference to FIG. 8A. That is, the S curve can be defined by two radii of curvatures R1 and R2, having opposite directions. Each of the radii of curvatures R1 and R2 should satisfy a predetermined radius resonance condition described with reference to FIGS. 9 through 13C. When each of the two radii of curvatures R1 and R2, correspond to a resonance radius, incident light passes and is emitted while having the maximum transmission throughput in a section where each of the radii of curvatures R1 and R2 are defined. A structure of shifting an optical path in parallel without a direction change is available by combining the cores 22, each being capable of changing a direction by 90°, in the opposite directions.

Figure 17A:
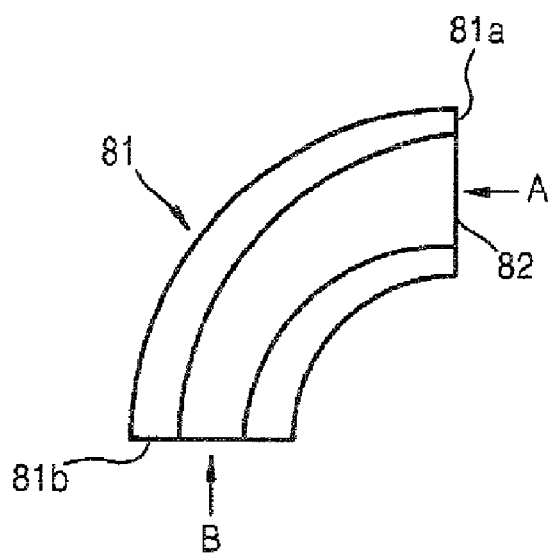
FIGS. 17A through 17C are cross-sectional views of a bending waveguide according to yet another exemplary embodiment of the present invention.
Figure 17B:
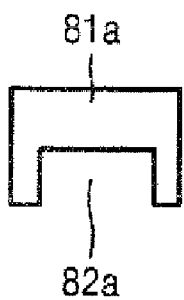
Figure 17C:
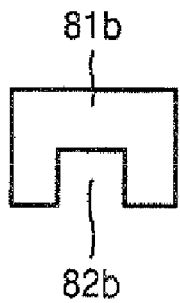

FIGS. 17A through 17C show a bending waveguide according to yet another exemplary embodiment of the present invention. Like the above exemplary embodiments, since the outer shape of the metal cladding in the present embodiment does not need a special definition, FIG. 17A shows only a core of the bending waveguide. FIG. 17B shows the structure of a C-shaped aperture having a wide width which is viewed at an input end 81a of a core 81 shown in FIG. 17A in a direction A. FIG. 17C shows the structure of a C-shaped aperture having a narrow width which is viewed at an output end 81*b* of the core 81 shown in FIG. 17A in a direction B.

Referring to FIGS. 17A through 17C, the overall width and thickness of the core 81 are constant over the length of the core 81, but the width of a ridge portion 82 formed as a metal cladding (not shown) protruding towards the center portion of the core 81 gradually decreases from the input end 81*a* to the output end 81*b*. Such a tapered type is advantageous in improving a coupling efficiency of an external light source and other waveguide and reducing the size of a spot of the emitted near field light. That is, to improve the coupling efficiency with the external light source, the overall width and thickness of the core 81 may be increased and the width of the ridge portion 82*a* at the input end 81*a* may also be increased. Since the spot size of the near field light that is emitted is proportional to the width of the ridge portion 82*b* at the output end 81*b*, the width of the ridge portion 82*b* at the output end 81*b* may be reduced to be sufficiently smaller than the wavelength of the incident light.

The above-described tapered type is merely an example and the present invention is not limited thereto. For example, a tapered type is possible, in which not only the width of the ridge portion but also the cross section itself gradually decreases in a direction in which the incident light is transmitted. The bending waveguide in the present embodiment can be a flat type waveguide having a constant thickness. In this case, a tapered type in which the thickness of the core 81 is constant and the width of the core 81 gradually decreases in a direction in which the incident light is transmitted is possible. In the tapered type, the resonance such as the radius resonance described with reference to FIGS. 9 through 13C is generated. The radius of curvature of the core 81 may be a resonance radius at which the resonance is generated with respect to the wavelength of the incident light.

In the above-described embodiments, the cross section of the core has the C-shaped aperture structure, but the present invention is not limited thereto. The cross section of the core can be appropriately designed such that the resonance of the incident light can be generated. However, at least a sectional surface at the output end of the core may have a near field enhanced aperture structure to emit a near field light.

Figure 18A:
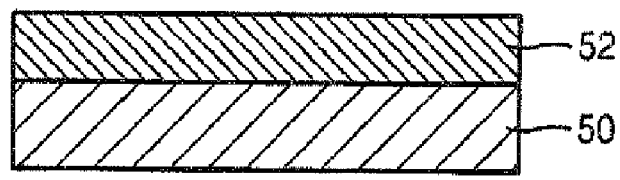
FIGS. 18A through 18J show a method of fabricating the bending waveguide of FIGS. 8A and 8B.
Figure 18B:
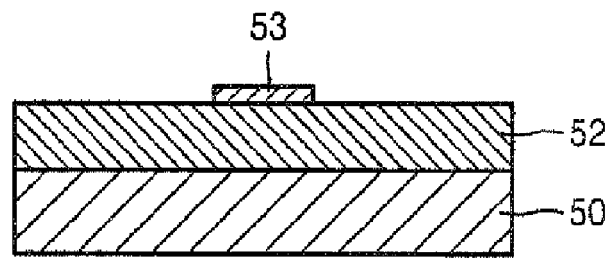
Figure 18C:
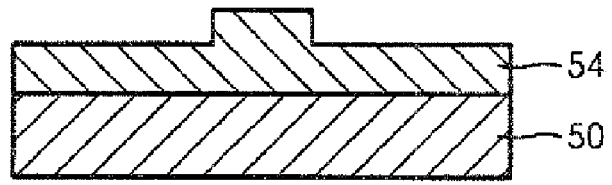
Figure 18D:

A method of fabricating the bending waveguide described with reference to FIGS. 8A and 8B according to an exemplary embodiment of the present invention will be described below with reference to FIGS. 18A through 18J. First, referring to FIG. 18A, a metal layer 52 is deposited on a substrate 50 using, for example, a sputtering method. As shown in FIG. 18B, resist 53 is masked on the metal layer 52 and part of the metal layer 52 is etched using a reactive-ion etching (RIE) process to remove the resist 53. As a result, a lower cladding layer 54 of a ridge structure is formed as shown in FIG. 18C. FIG. 18D is a perspective view showing the lower cladding layer 54 only. As shown in FIG. 18D, a pattern of the resist 53 is formed such that the ridge portion of the cladding layer 54 has a curved shape satisfying a predetermined radius of curvature.

Figure 18E:
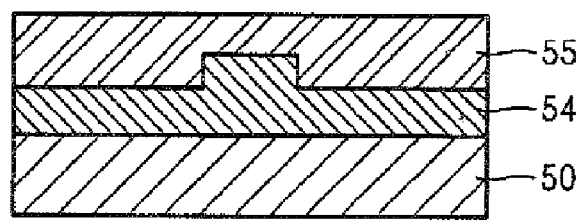

As shown in FIG. 18E, resin 55 is coated on the lower cladding layer 54 using, for example, a spin coating method. The resin 55 is formed of a UV curing material. The thickness of the resin 55 is equal to or less than the wavelength of incident light.

Figure 18F:
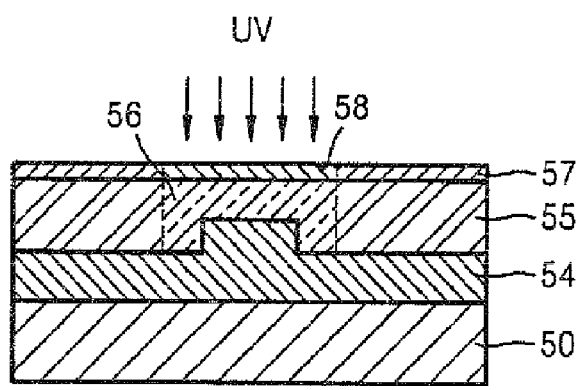

As shown in FIG. 18F, patterns 57 and 58 are transferred to an upper surface of the resin 55 and UV rays are emitted onto the resin 55 through an uncovered area, that is, the pattern 58. An area, which has received the UV ray emission is cured to form a core layer 56. A width of the pattern 58 is equal to or less than the wavelength of the incident light. Further, the patterns 57 and 58 formed on the resin 55 have a curved shape satisfying a predetermined radius of curvature so that a manufactured bending waveguide satisfies a radius resonance condition.

Figure 18G:
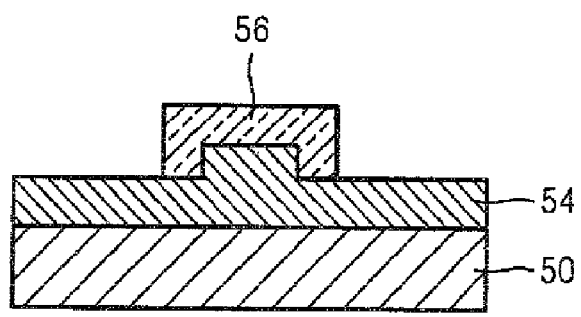
Figure 18H:
Figure 18I:
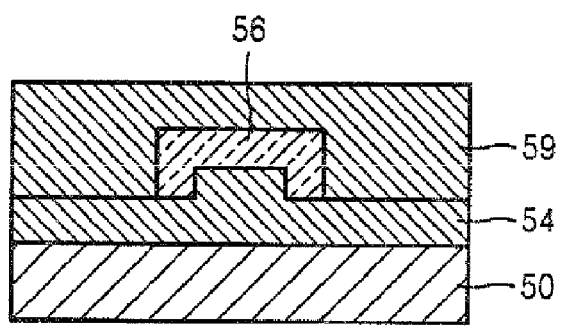
Figure 18J:
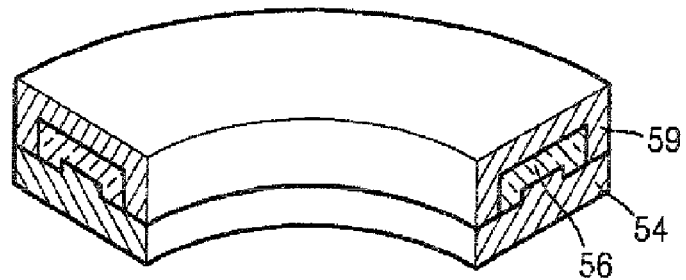

As shown in FIG. 18G, the resin 55 that is not cured and the pattern transferred thereon are removed. FIG. 18H is a perspective view of only the lower cladding layer 54 and the core layer 56 formed thereon. As shown in FIG. 18I, an upper cladding layer 59 is deposited on the core layer 56. The upper cladding layer 59 can be formed by depositing a metal using, for example, a sputtering method. FIG. 18J is a perspective view of a completed bending waveguide.

As described above, the bending waveguide can be manufactured in a planar process method such as a typical magnetic head manufacturing process. Accordingly, a near field light generating apparatus using the bending waveguide and a HAMR head employing the bending waveguide can be manufactured in a batch process as described below.

Figure 19:
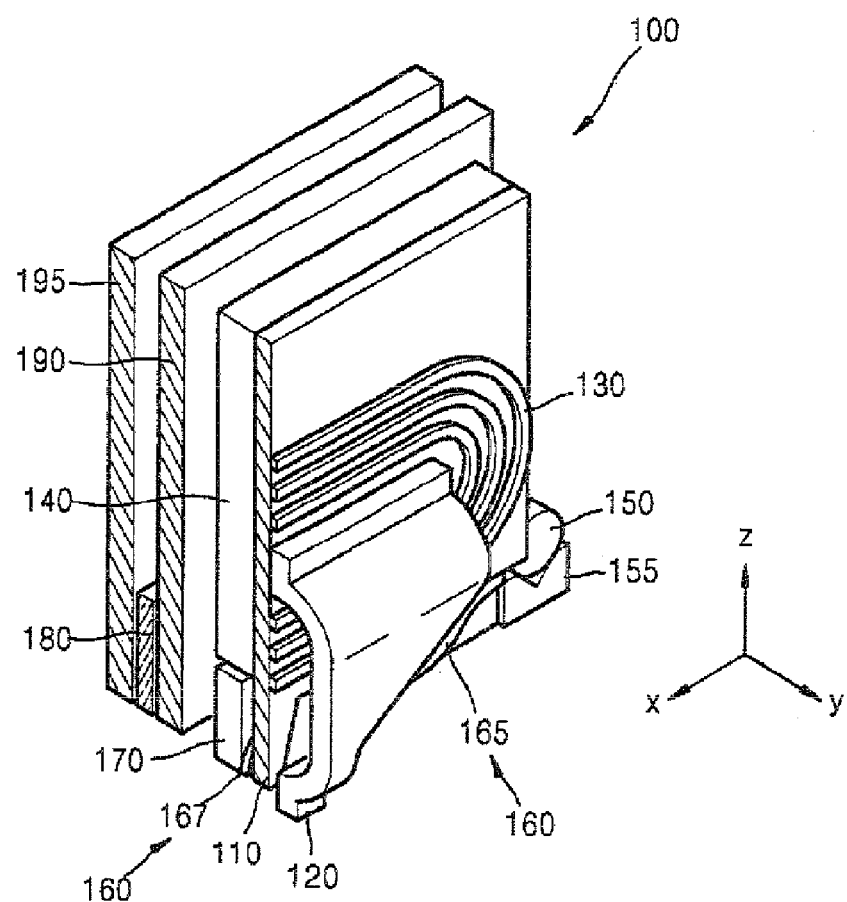
FIG. 19 is a perspective view of a heat assisted magnetic recording head according to an exemplary embodiment of the present invention.
Figure 20:
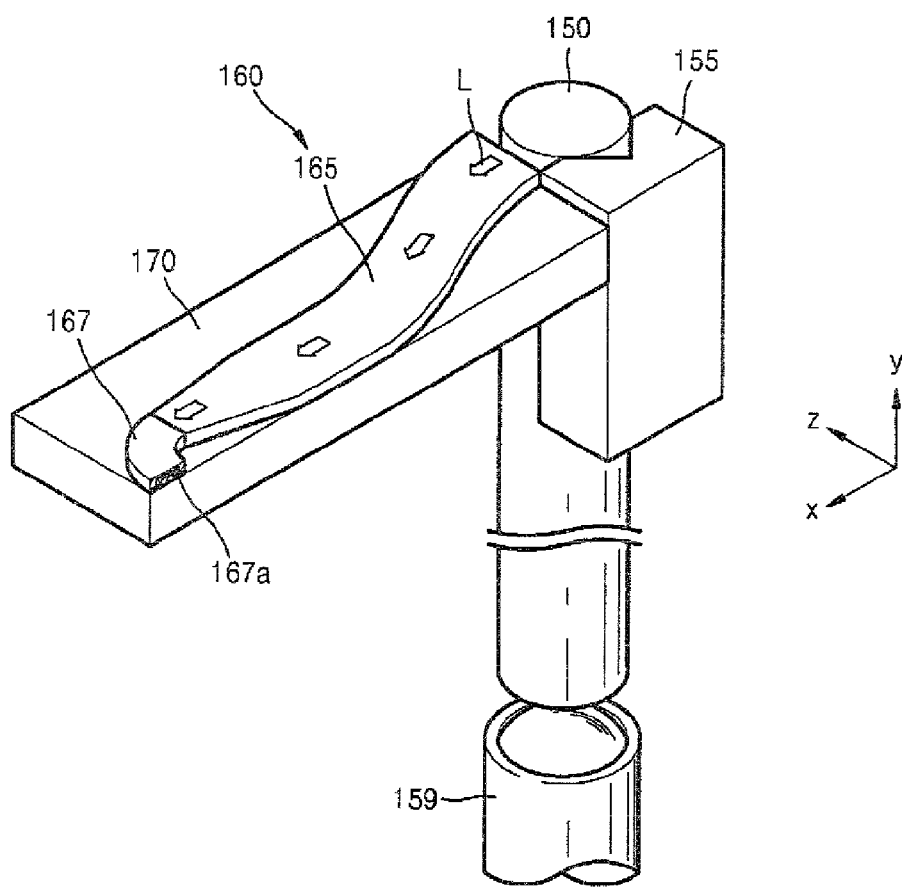
FIG. 20 is a perspective view of a light delivery module shown in FIG. 19.

A light delivery module and a HAMR head according to an embodiment of the present invention will be described with reference to FIGS. 19 and 20. FIG. 19 is a perspective view of a HAMR head according to an exemplary embodiment of the present invention. FIG. 20 is a perspective view of a light delivery module employed in the HAMR head.

Referring to FIGS. 19 and 20, a HAMR head 100 according to the present embodiment includes a magnetic recording portion forming a magnetic field to record information on a magnetic recording medium (not shown) and a light delivery module 160 emitting light L to heat a recording scheduled area of the magnetic recording medium. Further, the HAMR head 100 can be integrated with a reproduction device 180 for reading recorded information. Reference numerals 190 and 195 denote shield layers shielding a stray field.

The magnetic recording portion includes a main pole 110, a return pole 120, an inductive coil 130, and a sub-yoke 140. The main pole 110 forms a magnetic field that magnetizes a magnetic recording medium. The return pole 120 is separated a predetermined distance from a surface of the main pole 110 and magnetically connected to the main pole 110, forming a magnetic path. The inductive coil 130 induces a magnetic field in the main pole 110. The sub-yoke 140 is provided on the other surface of the main pole 110 and assists in concentrating a magnetic flux at an end of the main pole 110.

The light delivery module 160 in the present embodiment is a unit for heating a recording scheduled area of the magnetic recording medium. The light delivery module 160 includes a first waveguide 167 emitting light L to the magnetic recording medium through an opening 167*a*, and a second waveguide 165 transmitting the light L received from an external light source 159 to the first waveguide 167.

The light delivery module 160 may be arranged close to the main pole 110 so that light can be emitted just before information is recorded on the magnetic recording medium. Since the end of the sub-yoke 140 is located not to reach the end of the main pole 110, the light delivery module 160 can be arranged in a predetermined space encompassed by the end of the sub-yoke 140, the other surface of the main pole 110, and the shield layer 190. Since the space can be easily secured in the structure of the conventional magnetic recording head, the HAMR head according to the present embodiment can be manufactured without greatly changing the thin film manufacturing process of the conventional magnetic recording head. The first and second waveguides 167 and 165 have a flat structure so as to be formed by being deposited on the same layer as the sub-yoke 140. Reference numeral 170 denotes an auxiliary mount to compensate for a difference in thickness between the light delivery module 160 and the sub-yoke 140.

Assuming that a surface of the HAMR head 100 facing the magnetic recording medium is a bottom surface, the input end of the second waveguide 165 is provided at a side surface of the HAMR head 100. An optical fiber 150 guiding the light L transmitted from the external light source 159 is arranged on the side surface of the HAMR head 100 where an input end of the second waveguide 165 is located. Reference numeral 155 denotes a suspension supporting the optical fiber 150. The light source 159 may be, for example, a laser diode LD emitting a laser beam.

The optical fiber 150 has a circular cross-section while the second waveguide is a flat type waveguide having an input end that has a rectangular cross-section. Accordingly, a coupling efficiency is deteriorated due to the difference in the shape of the sections. Thus, to improve the coupling efficiency by increasing a contact portion between the optical fiber 150 and the second waveguide 165, the rectangular cross-section of the input end of the second waveguide 165 is sufficiently extended in a direction along the width thereof, that is, in a direction "z". Also, the coupling efficiency can be further improved by employing a graded-index single-mode fiber as the optical fiber 150. A method of improving the coupling efficiency by interposing a ball lens or a graded-index lens in the coupling portion between the optical fiber 150 and the second waveguide 165 can be used.

The second waveguide 165 receives the light L from the side surface of the HAMR head 100 and guides the received light L toward the first waveguide 167 located at the end of the main pole 110. The width of the output end of the second waveguide 165 may be almost equal to the size of the input end of the first waveguide 167 to improve the coupling efficiency with the first waveguide 167. As described above, in order to improve the coupling efficiency of the second waveguide 165 with the optical fiber 150 and the first waveguide 167, the width of the input end of the second waveguide 165 can be greater than the width of the output end. That is, the second waveguide 165 may be a tapered type so that the width of the core thereof gradually narrows in a direction in which the light is transmitted.

The bending waveguide according to the present embodiment is employed as the first waveguide 167. The input end of the first waveguide 167 is coupled to the output end of the second waveguide 165. A butt-coupling method, for example, can be used for the above coupling. The core of the first waveguide 167 and the core of the second waveguide 165 can be integrally formed.

The output end of the first waveguide 167 faces the bottom surface of the HAMR head 100 to emit light onto the magnetic recording medium. Since the input end of the second waveguide 165 is arranged at the side surface of the HAMR head 100, the second waveguide 165 transmits the light in the direction "x" as shown in FIG. 20 and the output end of the second waveguide 165 is arranged in the direction "x". Thus, since the input end of the first waveguide 167 is arranged in a direction "–x" and the output end is arranged in a direction "–z", the angle between the input end and the output end of the first waveguide 167 is 90°. To minimize the loss of light in the first waveguide 167, the radius of curvature of the first waveguide 167 is designed to be a resonance radius that is determined by the wavelength of the light emitted from the light source (159) and the above angle, as described above. For example, the C-shaped waveguide that is bent by 90° as described with reference to FIGS. 8A and 8B can be employed as the first waveguide 167. Furthermore, the size of the output end of the first waveguide 167 is may be as small as possible to reduce the size of a spot of the near field light. However, since the size of the input end of the first waveguide 167 may be similar to the size of the output end of the second waveguide 165, the core of the first waveguide 167 may be a tapered type having a width thereof, which is gradually decreasing in the direction in which the incident light is transmitted.

The first waveguide 167 receives the light L from the second waveguide 165 and emits a near field light enhanced by changing the energy distribution of the light to the magnetic recording medium. The magnetic recording medium is locally heated by the emitted light and the coercive force of the magnetic recording medium is deteriorated. Thus, the magnetic recording medium can easily perform magnetic recording even when the intensity of the magnetic field generated by the main pole 110 is not great. Also, since a material exhibiting a great coercive force can be used for the magnetic recording medium, recording density can be improved.

Although many items have been described in detail above, they must be interpreted as not limiting the scope of the invention but as mere embodiments. For example, those skilled in the art may vary the position of the constituent elements or may choose to vary the constituent elements of the HAMR head 100.

Furthermore, in the above descriptions, the bending waveguide and the light delivery module described with reference to FIGS. 19 and 20 are employed in the HAMR head. However, the present invention is not limited thereto. The bending waveguide according to the present invention and the light delivery module using the same are optical elements having a small light spot and a high light intensity which can be used not only for the HAMR head but also in a variety of fields employing nano-materials and super high density storage devices, for example, single molecule detection, spectroscopy, nano-particle manipulation and single quantum dots, nano particles, nano wires, etc.

For example, in the field of biochemistry, a near field probe having a high spatial resolution is used in microscopy for study at a molecular level, spectroscopy, and optical manipulation. When the installation space of the near field probe is limited, the near field probe can be easily installed by employing the bending waveguide according to the present invention and the light delivery module using the same as the near field probe.

As another example, in an optical storage device, a bending waveguide and the optical delivery module using the same can be applied to a very small aperture laser (VSAL) having a small aperture in front of a semiconductor laser so that the recording density and reproduction speed of the optical storage device can be greatly improved.

As described above, the bending waveguide according to the present invention, a method of fabricating the bending waveguide, a light delivery module employing the bending waveguide, and a heat assisted magnetic recording head employing the bending waveguide, may have, but are not limited to the following advantages.

First, the direction of the incident light can be changed by a predetermined angle while maintaining the field enhancement characteristic of the conventional near field enhanced aperture without an additional optical element.

Second, a small spot size and a high light intensity can be obtained by the near field enhanced aperture such as a C-shaped aperture.

Third, since the bending waveguide can be fabricated through a low temperature planar process, it can be fabricated integrally with the conventional magnetic recording head.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A bending waveguide comprising:
a core having an input end and an output end, wherein at least the output end has a near field enhanced aperture structure; and
a metal cladding disposed around the core,
wherein the core is bent in a curve and a radius of curvature of the curve is a resonance radius at which an intensity of transmitted light with respect to a wavelength of incident light is a maximum;
wherein an output end of the core has a C-shaped aperture structure, wherein a part of the metal cladding protrudes towards a center portion of the C-shaped aperture structure forming a ridge portion; and
wherein the core has a C-shaped cross-section throughout a length thereof.

2. The bending waveguide of claim 1, wherein the width of the ridge portion gradually decreases from the input end to the output end.

3. The bending waveguide of claim 1, wherein a cross-sectional area of the core is the same throughout a length of the core from the input end to the output end.

4. The bending waveguide of claim 1, wherein a cross-sectional area of an input end of the core is different from a cross-sectional area of the output end thereof.

5. The bending waveguide of claim 4, wherein a cross-sectional area of the core gradually decreases from the input end to the output end.

6. The bending waveguide of claim 5, wherein a thickness of the cross-section of the core is constant and a width of the cross-section of the core gradually decreases from the input end to the output end.

7. The bending waveguide of claim 1, wherein the core is bent in a circular curve having an angle $\theta(0<\theta<180)$ between the input end and the output end.

8. The bending waveguide of claim 1, wherein the core is bent in a curve, wherein the curve is defined by more than one radius of curvature.

9. A light delivery module comprising:
a first waveguide which comprises:
a core having an input end and an output end, wherein the output end has a near field enhanced aperture structure; and
a metal cladding enclosing the core,
wherein the first waveguide is a bending waveguide in which the core is bent in a curve and a radius of curvature of the curve is a resonance radius at which an intensity of transmitted light with respect to a wavelength of incident light is a maximum;
wherein an output end of the core of the first waveguide has a C-shaped aperture structure, wherein a part of the metal cladding protrudes towards a center portion of the C-shaped aperture structure forming a ridge portion; and
wherein the core of the first waveguide has a C-shaped cross-section throughout a length thereof.

10. The light delivery module of claim 9, further comprising a second waveguide which transmits light to the first waveguide.

11. The light delivery module of claim 10, wherein the first waveguide and the second waveguide are butt-coupled.

12. The light delivery module of claim 9, wherein the width of the ridge portion gradually decreases from the input end to the output end.

13. The light delivery module of claim 10, wherein a cross-sectional area of the core of the first waveguide gradually decreases from the input end to the output end.

14. The light delivery module of claim 9, wherein the core of the first waveguide is bent in a circular curve having an angle $\theta(0<\theta<180)$ between the input end and the output end.

15. The light delivery module of claim 9, wherein the core of the first waveguide is bent in a curve, wherein more than one radii of curvature define the curve.

16. A heat assisted magnetic recording head comprising:
a magnetic recording portion which forms a magnetic field; and
a light delivery module which emits light, which heats a recording scheduled area of a magnetic recording medium,
wherein the light delivery module comprises:
a first waveguide which comprises a core having an input end and an output end, wherein the output end has a near field enhanced aperture structure, and a metal cladding enclosing the core; and
a second waveguide which transmits light to the first waveguide,
wherein the first waveguide is a bending waveguide in which the core is bent in a curve and a radius of curvature of the curve is a resonance radius at which an intensity of transmitted light with respect to a wavelength of incident light is a maximum;
wherein an output end of the core of the first waveguide has a C-shaped aperture structure, wherein a part of the metal cladding protrudes towards a center portion of the C-shaped aperture structure forming a ridge portion; and
wherein the core of the first waveguide has a C-shaped aperture structure throughout a length thereof.

17. The heat assisted magnetic recording head of claim 16, wherein, an input end of the second waveguide is provided at a side surface of the heat assisted magnetic recording head.

18. The heat assisted magnetic recording head of claim 17, wherein the first waveguide has an input end that is coupled to an output end of the second waveguide and also has an output end that faces a bottom surface of the heat assisted magnetic recording head.

19. The heat assisted magnetic recording head of claim 16, wherein the width of the ridge portion gradually decreases from the input end to the output end.

20. The heat assisted magnetic recording head of claim 16, wherein a cross-sectional area of the core gradually decreases from the input end to the output end.

21. The bending waveguide of claim 8, wherein each said radii of curvature corresponds to a resonance radius.

22. The bending waveguide of claim 15, wherein each said radii of curvature corresponds to a resonance radius.

* * * * *